Aug. 15, 1950     H. U. GARRETT ET AL     2,519,242
PRESSURE RESPONSIVE VALVE
Filed March 27, 1947     2 Sheets-Sheet 1
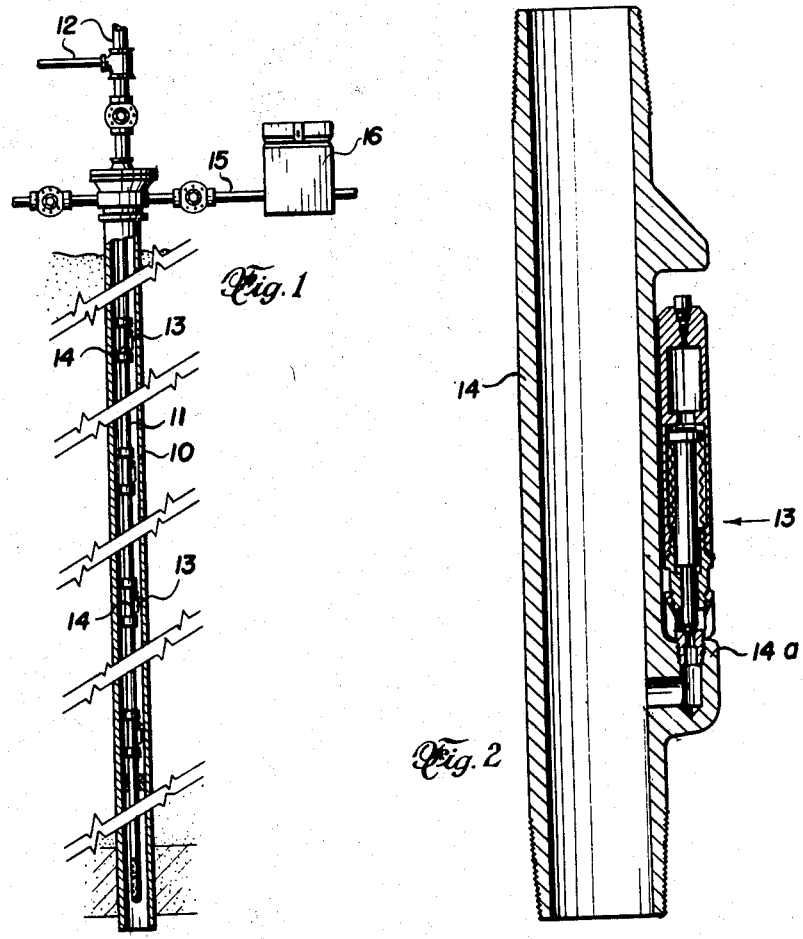
HENRY U. GARRETT
CLIFFORD M. PETERS
         INVENTORS.
BY *J. Vincent Martin*
    *Ralph R. Browning*
    *James B. Simms*
         ATTORNEYS Aug. 15, 1950     H. U. GARRETT ET AL     2,519,242
PRESSURE RESPONSIVE VALVE
Filed March 27, 1947     2 Sheets-Sheet 2
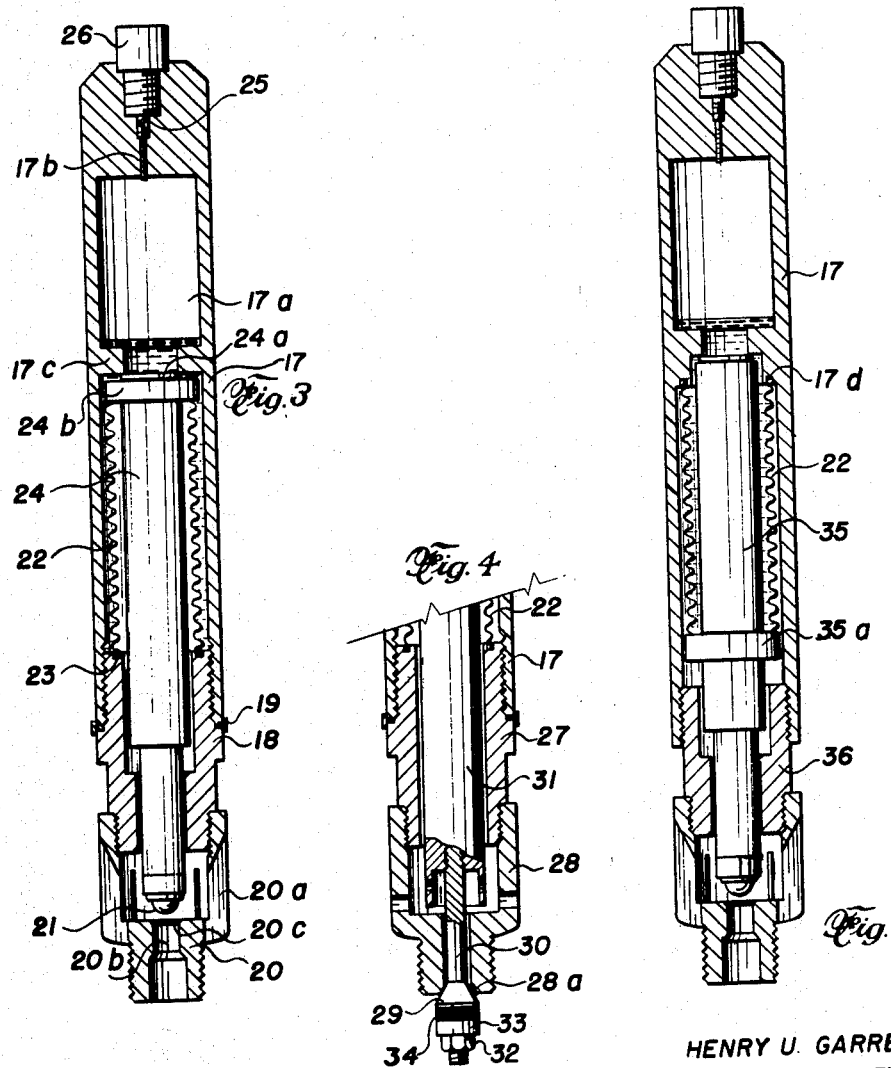
HENRY U. GARRETT
CLIFFORD M. PETERS
INVENTORS.
ATTORNEYS Patented Aug. 15, 1950

2,519,242

UNITED STATES PATENT OFFICE 2,519,242

PRESSURE RESPONSIVE VALVE

Henry U. Garrett and Clifford M. Peters, Longview, Tex., assignors, by direct and mesne assignments, to Garrett Oil Tools, Inc., Houston, Tex., a corporation of Texas Application March 27, 1947, Serial No. 737,600

13 Claims. (Cl. 137—153)

This invention relates to improvements in pressure responsive valves and relates more particularly to bellows type valves.

While valves according to this invention have a number of uses the valves are especially adapted for use in gas lift production of oil wells and in the description of the invention the discussion will be limited to this use, for the most part, but it is to be understood that this is done by way of illustration and not by way of limitation.

A customary method of raising well liquids to the surface has been to use bellows type pressure responsive valves for introduction of a lifting gas into the liquid column within pipe strings of well bores. However, a great deal of difficulty has been encountered due to bellows failure caused by excessive pressures to which the bellows are subjected during installation of the valves within the well bore and in operation thereof. Often times, especially during the installation of valves, the valves are subjected to a hydrostatic head of liquid which may be oil, water, mud, mixtures thereof or the like. The column of liquid may range from a few hundred feet to 15,000 feet and even more. As the usual practice is to charge the interior of the bellows with a predetermined pressure, usually ranging from 200 to 1,000#, the resulting differential across the bellows destroys the bellows and renders the valve devices inoperative. When this happens the entire string of pipe on which the valves have been mounted must be withdrawn from the well bore and the valves replaced or repaired.

Heretofore attempts have been made in valves of this type to provide a housing for the bellows which is sealed off from the pressure exterior of the device when excessive pressures are encountered. This may be accomplished for example by provision of valve means for the passage placing the bellows in communication with the pressure exterior of the housing which is adapted to close the passage when the pressure is excessive. This does not always work entirely satisfactorily. One of the principal causes for failure of the valve means to seal off the bellows housing is the presence of foreign matter upon the seat of valve member of the valve means which prevents formation of a proper seal.

Another cause for bellows failure in these valves is the tendency of the bellows to buckle in operation. Guides have been provided extending centrally of the bellows and having a stationary mounting relative to the bellows. However, wear caused by movement of the contact point of the bellows along the surface of the guides, in operation of the valve, frequently results in bellows failure.

An object of this invention is to provide a bellows type pressure responsive valve wherein the bellows is not damaged by pressures of even extreme magnitudes.

Another object is to provide bellows type pressure responsive valves having a non-compressible backing for the bellows surface opposite its surface which may be exposed to high pressures.

A further object is to provide a bellows type pressure responsive valve wherein the bellows defines a part of a sealed off liquid filled space or compartment when the bellows has been flexed a predetermined amount.

Still another object is to provide a bellows type pressure responsive valve wherein the bellows defines a part of a sealed off liquid filled space or compartment when the bellows has been flexed a predetermined amount, wherein excessive pressures due to expansion of the liquid are automatically relieved.

A still further object is to provide a bellows type pressure responsive valve wherein the outside periphery of the bellows is subjected to a predetermined pressure charge.

Yet another object is to provide a bellows type pressure responsive valve having a bellows guide mounted in such manner as to move in the same direction as the bellows during flexure thereof to reduce the relative movement between the points of contact of the bellows with the guide.

Other and further objects of this invention will appear from the following description.

In the accompanying drawings which constitute a part of the instant specification, are to be read in conjunction therewith and wherein like reference numerals designate like parts in the various views:

Fig. 1 is a schematic sectional illustration of an oil well equipped with gas lift valves according to this invention, illustrating the surface and control equipment in elevation;

Fig. 2 is an enlarged sectional view of one of the valves and coupling members shown in Fig. 1;

Fig. 3 is an enlarged sectional view of the valve constituting the preferred embodiment of this invention, the valve illustrated being that shown in Figs. 1 and 2 also;

Fig. 4 is an enlarged fragmentary sectional view of a modification of the valve shown in Figs. 1 to 3; and Fig. 5 is an enlarged sectional view of a valve illustrating another modification of this invention.

Referring to the drawings, and more particularly to Fig. 1, a well bore is schematically illustrated in section. The bore is equipped with an oil string of casing 10 with a conventional well head at the ground surface and a string of flow tubing 11 extending within the casing and through the well head and having flow connections 12 at its upper end. Pressure responsive valves in accordance with this invention are shown at 13 and are mounted on coupling sections 14 made up within the string of flow tubing. A gas supply line 15 has a connection through the well head with the annular space between the casing and tubing strings. The flow of gas through the line may be controlled by any suitable surface controller 16. This controller usually is of the time intermitter type and is effective to increase the pressure within the tubing casing annulus to a predetermined amount at selected time intervals. This increase in pressure is effective to open one or more of the valve devices as is customary in gas lift operations.

Referring now to the details of the valve, it will be seen by reference to Fig. 3 that the valve has an upper cylindrical housing 17. To the lower end of the housing is threadedly secured the head bushing 18. A seal is provided between the bushing and housing and may be in the form of a solder sealing ring 19. The valve body is completed by the valve head 20 threadedly secured to the lower end of head bushing 18. The valve head is provided with slotted ports 20a and has a passage 20b through its lower end. This passage contains a seat 20c which cooperates with a valve member 21 to control the flow through passage 20b in a manner which will be hereinafter more fully explained.

Bellows 22 forms a pressure chamber within the valve body. The bellows has sealing engagement with the valve body at its lower end. In this embodiment, and with the upper end of a combination bellows guide and valve stem 24, solder rings such as shown at 23 provide a suitable seat in each instance. The bellows guide has a cylindrical portion extending axially through the bellows, the outside diameter of which is somewhat less than the smallest inside diameter of bellows 22. Adjacent its lower end the guide has a portion of reduced diameter which has a slide fit within the reduced bore through head bushing 18. While the fit of the guide within the bore is close enough to maintain the axial position of the guide stem within close limits, nevertheless it is sufficiently loose to permit free passage of fluid therepast into the interior of bellows 22 and to permit free axial movement of the guide. Valve member 21 is mounted at the lower end of guide stem 24 and thus is carried by the free or upper end of bellows 22.

The pressure chamber itself is made up of a bellows portions and an upper dome portion 17a adapted to be charged with a fluid under pressure. Suitable charging means is provided such as the pressure fluid passage 17b controlled by a conventional spring pressed valve core 25. Preferably a sealing cap 26 is secured in the end of passage 17b and is soldered or otherwise sealed to the end of the housing to insure against loss or escape of the pressure charge.

Housing 17 has an inner apertured partition 17c which separates the pressure dome portion of the chamber from the bellows. Stem 24 carries a sealing cap 24a which seats against the lower side of partition 17c to close off the pressure dome from the bellows when the bellows has been flexed to the extent shown in Fig. 3. With the bellows in its other extreme flexed condition the valve member 21 engages seat 20c as shown in Fig. 2 and sealing cap 24a is spaced somewhat below partition 17c. Thus the dome portion of the pressure charged chamber is in communication with that portion of the chamber defined in part by the bellows.

It will be noted that the upper or sealing surface of cap 24a is spaced somewhat above the annular shoulder formed by the upper surface of the portion 24b of somewhat enlarged diameter of guide 24. This is provided so that when the pressure dome portion of the chamber is sealed off from the bellows portion of the charged chamber and the pressure within the bellows portion should be increased for any reason above that within the dome and also above that within the interior of the bellows then the bellows will be collapsed somewhat to move sealing cap 24a from sealing engagement with the underside of partition 17c. This permits a relief of the excess pressure and equalizes the pressure within the dome and the other portion of the charged chamber. Thus, there has been provided an automatic valve for relieving excessive pressures that may develop within the bellows housing. This automatic valve is encased within the pressure chamber where it is protected from foreign material which might prevent it from forming a seal.

The excessive pressures just referred to are likely to be built up when a liquid is employed within the bellows portion of the pressure charged chamber due to expansion of the liquid when cap 24a is in sealing engagement about the aperture of partition 17c and the temperature of the liquid is raised as is frequently the case in installing such valves in wells producing from deep formations.

Whenever the valves of this invention are likely to be subjected in use to pressures materially greater than the charge within the pressure dome, it is preferable to fill the pressure charged part of the chamber with sufficient liquid to completely fill the bellows portions thereof when the cap 24a is in sealing engagement with the underside of partition 17c. However, the liquid level should not be sufficiently high to materially reduce the volume of pressure dome 17a, as a relatively large volume of gas insures free, sensitive flexure of the bellows to open and close the valve. This liquid in the sealed off bellows portion of the chamber provides a non-compressible backing for the bellows, which protects the bellows against the excessive pressure such a encountered when the valves are subjected to a hydrostatic head due to a column of liquid of hundreds or thousands of feet. The seal between the cap 24a and partition 17c is within the pressure chamber and there is no possibility of foreign material from the interior of the well bore interfering with proper formation of a seal as is the case in the valves heretofore used, wherein an attempt has been made to seal off the bellows chamber itself from excessive pressures exterior of the valve.

In operation a series of the valves such as shown in Fig. 3 may be connected into coupling units 14 by threading the lower end of valve head 20 into fittings 14a of the units. These units are then placed within the flow tubing string as the tubing string is made up and lowered within the casing and form a part thereof or may be installed in the well in any other suitable manner. The valves 13 are charged with different pressures, the upper valve being charged with the greatest pressure and each successive lower valve charged with successively reduced pressures. Thus, the upper valves are used to dump the liquid accumulated in the well prior to and during installation of the valves and when the liquid has been reduced to a position below the second lowest valve then the lowest or working valve is utilized in normal production. The working and dumping of the well is according to conventional practice and is controlled by controller 16 in a manner well understood by those skilled in the art.

With regard to the operation of the valve, it is believed obvious that when the pressure in the casing tubing annulus exceeds the pressure charge of an individual valve 13, that is the pressure charge within the dome and bellows portion of the pressure chamber, that the pressure differential will cause a flexure of bellows 22 until cap 24a engages partition 17c. Preferably sufficient liquid is placed within the pressure chamber to completely fill the bellows portion of the pressure chamber with the dome portion sealed off. The liquid forms a backing for the bellows and an increase of casing tubing annulus pressure at a point about the valve will not effect further distortion of the bellows except within the compressible limits of the liquid which for practical purposes can be disregarded and considered as zero. Thus, the bellows is protected from the pressure exterior of the valve even though it is extremely high. This protection is positive and does not rely upon proper engagement of a valve and seat in a construction wherein the valve and seat are exposed to the foreign material, sand and the like, always present within a well bore. The sealing cap 24a and cooperable seating surface of partition 17c is protected from any such foreign material.

In installing gas lift valves in a producing oil well when the string of tubing is made up with the valves in place and lowered into the casing, the valves are of course held closed by the pressure within the pressure dome until the exterior of the valves are exposed to pressures greater than the charge within the pressure chamber of the valve housing. When the exterior pressure increases sufficiently to flex the valve bellows the valves are opened and sealing cap 24a, with the valve member 21 in completely open position, closes off the pressure dome portion of the pressure charged chamber.

Often times during installation of the valves within a well, the liquid within the well is at an elevated temperature compared to the liquid within the pressure charged chamber of valves 13. The valve liquid is quickly raised in temperature to substantially that of the well liquid and expansion of the liquid results in pressure increases outside of the bellows. However, if this increase becomes appreciably greater than the pressure exterior of the valve, which would result in a distortion or rupture of bellows 22 if not relieved, a pressure differential is created across the large diameter portion 24b of guide 24 and guide 24 is moved downwardly to crack sealing cap 24a from its seat. This then permits a relief of this excessive pressure whereby the bellows is protected.

In operation the pressure within the casing tubing annulus decreases the pressure within the pressure charged chamber of the valves flexes bellows 22 whereby the end of the bellows connected to guide 24 is moved downwardly and effects a seating of valve member 21 in seat 20c to close the valve.

During the opening and closing operations of any of the valves 13 the guide 24 moves in a direction corresponding with the movement of the bellows 22. This corresponding movement reduces the relative movement between any portion of the bellows in contact with the periphery of the guide. Thus wear of the contact portion of the bellows is reduced and the guide effectively prevents buckling of bellows 22 and serves to keep it in proper axial alignment.

Any suitable liquid may be employed within the pressure charged chamber of the valves taking into consideration the temperature ranges that are likely to be encountered in operation so as to prevent either substantial volatilization or freezing of the liquid. Also, it is preferable that a liquid be employed that has a low coefficient of expansion due to temperature changes. It has been found in practice that ethylene glycol is suitable for this purpose in most well installations. Mercury is also satisfactory but where used the material of the seal means for the pressure charged chamber must be other than solder which is soluble in mercury.

In installations where valves 13 are likely to be subjected to excessively high external pressures it is preferred to use a liquid within the pressure charged valve chamber as hereinabove described. However, even in the absence of the liquid the structure is advantageous and where only relatively low pressures differentials between the charged pressure and those likely to be encountered exterior of the valves, the liquid may be dispensed with and still satisfactory results can be obtained. However, it is to be understood that under any pressure conditions best results are obtained by use of the liquid. When the liquid is dispensed with the sealing cap 24a seals off the pressure dome in the same manner as it does when the liquid is employed at the instant that the valve member 21 is in its completely opened position. Thus, the volume of the space surrounding bellows 22 is relatively small compared to the total volume of the pressure charged chamber. Obviously the smaller this volume the more rapidly the pressure thereof will increase for a given change therein due to distortion of the bellows caused by increases in the pressure acting on the inner surface of bellows 22. Thus a given increase in pressure, acting on the inner surface of the bellows, will produce a lesser distortion of the bellows in this construction than in a construction wherein all of the pressure charged chamber is always acting as a unit.

It will be appreciated that the pressures charge within the valve shown in Fig. 3 acts against the outer periphery of bellows 22. This makes possible the charging of the valve with a greater pressure than where the interior of the bellows receives different pressure. This makes possible the greater space of the valve within the flow tubing 14 and also provides a greater working pressure for the working valve adjacent the bottom of the well.

In Fig. 4 there is shown a slight modification of the valve of Fig. 3. The difference in this modification is that the valve is a pressure opened valve rather than a pressure closed valve. A slightly modified head bushing 27 having a uniform diameter bore is threaded to housing 17 and a modified valve head 28 is threaded to the lower end of bushing 27. This valve head has radial ports communicating with the exterior of the valve and has an axial passage through one end with a seat 28a cooperable with valve member 29 to control flow through the radial and end ports.

Valve member 29 has a sliding fit on stem extension 30 carried by a somewhat modified valve stem and bellows guide 31. The free end of extension 30 carries a stop assembly comprising a bolt 32, washer 33 and cushioned washer 34. The washer 34 is made of resilient material and the arrangement permits seating of valve member 29 in seat 24a slightly before the bellows is expanded to its extreme raised position.

The cushioned stop assembly made up of nut 32 and washers 33 and 34 is provided so that in the event of wear of either the valve seat 28a or valve member 29 the valve will be closed whenever the pressure exterior of the valve exceeds that of the charge within the pressure charged chamber of the valve.

In installation this modification of the valve is connected within the well tubing string in the same manner as the valve of Fig. 3 as the lower end of valve head 28 may be threaded into fitting 14a of a coupling member 14 which in turn may be fitted within the tubing string.

Referring now to the modification of Fig. 5 it is seen that the principal difference between it and the valve of Fig. 3 resides in the inverted position of the bellows wherein the upper end of the bellows is sealed at 17d to housing 17 and at its lower end to an enlarged diameter portion 35a of the combined valve stem and bellows guide 35.

In this modification the part of the pressure chamber defined by the bellows resides within the bellows and the valves may not be charged with quite a great a pressure as that of Fig. 3 where the bellows is made up of the same material and has the same structural characteristics. In this connection, it has been found that a three ply seamless Monel metal bellows gives satisfactory service in both instances. The advantage of the structure of Fig. 5 over that of Fig. 3 on the other hand is that no seal need be provided between the head bushing 36 and the lower end of housing 17. The advantages of the elimination of this sealed joint are believed to be obvious.

The operation of this valve is similar to that of the modification of Fig. 3 and it is believed to be obvious in view of the foregoing description of the operation of the other modifications and in the interest of simplicity, further description of the operation will be dispensed with.

It will be seen that the objects of this invention have been accomplished. There has been provided a bellows type pressure responsive vavle wherein the bellows is positively protected against excessive external pressures to which it may be subjected. The construction lends itself to economical fabrication and provides a valve of great utility which may be used in gas lift production of oil and in other operations requiring this type of valve. The arrangement is such that there is little tendency for the bellows to wear or buckle during flexing operations and the flexure of the bellows, in response to the pressure changes to which it is exposed, is free within predetermined limits as a large volume pressure chamber is provided during these limits. However, when the pressure to which the bellows is exposed increases beyond a predetermined limit the volume of the effective pressure chamber is substantially decreased to protect the bellows against the greater pressures and a non-compressible backing for the bellows may be readily provided.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other feature and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described our invention, we claim:

1. In a pressure responsive valve having a hollow body, a bellows sealingly secured at one end to the body dividing the interior thereof into two parts, inlet and outlet ports for one of the chamber parts, and a seat and cooperable valve member adapted to control flow through one of the ports, said valve member carried by the free end of the bellows, the other of said parts providing a pressure chamber for the bellows, the improvement which resides in the combination therewith of an apertured partition within the pressure chamber forming therein a dome portion separate from the bellows and a space defined in part by the bellows, said space communicating with the dome portion, and a part carried by the bellows and adapted to close the partition aperture with the valve member in one extreme position to close off the dome portion.

2. In a pressure responsive valve having a hollow body, a bellows sealingly secured at one end to the body dividing the interior thereof into two parts, inlet and outlet ports for one of the parts, a seat and a cooperable valve member adapted to control flow through one of the ports, said valve member carried by the free end of the bellows, the other of said parts providing a pressure chamber for the bellows, the improvement which resides in the combination therewith of a pressure dome within the pressure chamber and separate from the bellows, said dome communicating with the remainder of the pressure chamber and means for closing off the dome from the rest of the chamber on flexure of the bellows to place the valve member in one extreme position relative to the seat.

3. In a pressure responsive valve having a hollow body, a bellows sealingly secured at one end to the body dividing the interior thereof into two parts, inlet and outlet ports for one of the parts, a seat and a cooperable valve member adapted to control flow through one of the ports, said valve member carried by the free end of the bellows, the other of said parts providing a pressure chamber for the bellows, the improvement which resides in the combination therewith of a pressure dome within the pressure chamber and separate from the bellows, said dome communicating with the remainder of the pressure chamber and an element carried by the bellows and adapted to close off the dome from the rest of the chamber on flexure of the bellows to place the valve member in one extreme position relative to the seat.

4. In a pressure responsive valve of the type having a valved passage controlled by a bellows, a housing having a pressure chamber sealed off by the bellows and made up of a dome portion, separate from the bellows, and a portion defined in part by the bellows, the latter portion communicating with the dome portion and means including an element carried by the bellows and adapted to close off the dome from the bellows when the bellows is flexed in one direction a predetermined amount and to reestablish communication between the dome and the remainder of the pressure chamber upon flexure of the bellows in the other direction.

5. A valve as in claim 4 wherein the volume of the dome portion is substantially greater than that of the bellows portion of the chamber.

6. In a pressure responsive valve of the type having a valved passage controlled by a bellows, a housing having a pressure chamber sealed off by the bellows and made up of a dome portion, separate from the bellows, and a portion defined in part by the bellows, the latter portion communicating with the dome, means including an element carried by the bellows and adapted to close off the dome from the bellows when the bellows is flexed in one direction a predetermined amount and to reestablish communication between the dome and the remainder of the pressure chamber upon flexure of the bellows in the other direction, and sufficient liquid within the chamber to completely fill the portion thereof defined in part by the bellows when the dome is closed off.

7. In a pressure responsive valve of the type having a valved passage controlled by a bellows, a housing having a pressure chamber sealed off by the bellows and made up of a dome portion, separate from the bellows, and a portion defined in part by the bellows, the latter portion communicating with the dome, means including an element carried by the bellows and adapted to close off the dome from the bellows when the bellows is flexed in one direction a predetermined amount and to reestablish communication between the dome and the remainder of the pressure chamber upon flexure of the bellows in the other direction, said means having a part responsive to the pressure differential across the bellows whereby with the dome closed off an increase in pressure within the bellows portion of the chamber, as compared with the dome, tends to shift the bellows in a direction to place both portions of the chamber in communication and thereby relieve to some extent the pressure to which the bellows is subjected.

8. A valve as in claim 7 wherein the volume of the dome is substantially greater than that of the bellows portion of the chamber.

9. In a pressure responsive valve of the type having a valved passage controlled by a bellows, a housing having a pressure chamber sealed off by the bellows and made up of a dome portion, separate from the bellows, and a portion defined in part by the bellows, the latter portion communicating with the dome, means including an element carried by the bellows and adapted to close off the dome from the bellows when the bellows is flexed in one direction a predetermined amount and to reestablish communication between the dome and the remainder of the pressure chamber upon flexure of the bellows in the other direction, and sufficient liquid within the chamber to completely fill the portion thereof defined in part by the bellows when the dome is closed off, said means having a part responsive to the pressure differential across the bellows whereby with the dome closed off an increase in pressure within the bellows portion of the chamber, as compared with the dome, tends to shift the bellows in a direction to place both portions of the chamber in communication and thereby relieve to some extent the pressure to which the bellows is subjected.

10. In a pressure responsive valve of the type having a valved passage controlled by a bellows, a housing having a pressure chamber sealed off by the bellows, a partition with a passage therethrough dividing the pressure chamber into a pressure dome and another part, defined partially by the bellows, of variable capacity dependent upon the state of flexure of the bellows, an element movably mounted within the pressure chamber adapted to move in response to flexure of the bellows in response to a pressure differential thereacross to seat against the partition and seal off the passage and pressure dome upon predetermined flexure of the bellows in one direction and to unseat upon flexure of the bellows in the other direction and sufficient liquid within the pressure chamber to fill the variable capacity part thereof when the element is seated to close the passage.

11. In a pressure responsive valve of the type having a valved passage controlled by a bellows, a housing having a pressure chamber sealed off by the bellows, a partition with a passage therethrough dividing the pressure chamber into a pressure dome and another part, defined partially by the bellows, of variable capacity dependent upon the state of flexure of the bellows, an element carried by the free end of the bellows and adapted to move in response to flexure of the bellows in response to a pressure differential thereacross to seat against the partition and seal off the passage and pressure dome upon predetermined flexure of the bellows in one direction and to unseat upon flexure of the bellows in the other direction and sufficient liquid within the pressure chamber to fill the variable capacity part thereof when the element is seated to close the passage.

12. In a pressure responsive valve having a hollow body, a bellows sealingly secured at one end to the body dividing the interior thereof into two parts, inlet and outlet ports for one of the parts, a seat and a cooperable valve member adapted to control flow through one of the ports, said valve member carried by the free end of the bellows, the other of said parts providing a pressure chamber for the bellows, the improvement which resides in the combination therewith of a pressure dome within the pressure chamber and separate from the bellows, said dome communicating with the remainder of the pressure chamber, means for closing off the dome from the rest of the chamber on flexure of the bellows to place the valve member in one extreme position relative to the seat and sufficient liquid within the chamber to completely fill the portion thereof defined in part by the bellows when the dome is closed off.

13. In a pressure responsive valve having a hollow body, a bellows sealingly secured at one end to the body dividing the interior thereof into two parts, inlet and outlet ports for one of the parts, a seat and a cooperable valve member adapted to control flow through one of the ports, said valve member carried by the free end of the bellows, the other of said parts providing a pressure chamber for the bellows, the improvement which resides in the combination therewith of a pressure dome within the pressure chamber and separate from the bellows, said dome communicating with the remainder of the pressure chamber, an element carried by the bellows and adapted to close off the dome from the rest of the chamber on flexure of the bellows to place the valve member in one extreme position relative to the seat, and sufficient liquid within the chamber to completely fill the portion thereof defined in part by the bellows when the dome is closed off.

HENRY U. GARRETT.
CLIFFORD M. PETERS.

REFERENCES CITED

The following references are of record in the file of this patent:

UNITED STATES PATENTS

| Number | Name | Date |
|---|---|---|
| 2,278,420 | Boynton | Apr. 7, 1942 |
| 2,339,487 | King | Jan. 18, 1944 |
| 2,370,139 | Boynton | Feb. 27, 1945 |